(12) United States Patent
Chen et al.

(10) Patent No.: US 10,430,945 B2
(45) Date of Patent: Oct. 1, 2019

(54) SYSTEMS AND METHODS FOR COLOR DECONVOLUTION

(71) Applicant: Ventana Medical Systems, Inc., Tucson, AZ (US)

(72) Inventors: Ting Chen, Sunnyvale, CA (US); Srinivas Chukka, San Jose, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 15/422,343

(22) Filed: Feb. 1, 2017

(65) Prior Publication Data

US 2017/0206655 A1    Jul. 20, 2017

Related U.S. Application Data

(63) Continuation of application No. PCT/EP2015/067384, filed on Jul. 29, 2015.

(60) Provisional application No. 62/032,254, filed on Aug. 1, 2014.

(51) Int. Cl.
*G06T 7/00* (2017.01)
*G06T 7/90* (2017.01)

(52) U.S. Cl.
CPC ............ *G06T 7/0012* (2013.01); *G06T 7/90* (2017.01); *G06T 2207/10024* (2013.01); *G06T 2207/10056* (2013.01); *G06T 2207/30024* (2013.01)

(58) Field of Classification Search
None
See application file for complete search history.

(56) References Cited

U.S. PATENT DOCUMENTS

| | | | |
|---|---|---|---|
| 2003/0139886 A1* | 7/2003 | Bodzin | ................ G01N 21/47 702/28 |
| 2009/0226059 A1* | 9/2009 | Levenson | ................ G01N 1/30 382/128 |

OTHER PUBLICATIONS

Andrew Rabinovich et al, "Quantitative Spectral Decomposition for Stained Tissue Analysis", Proceedings of University of California San Diego Research Expo., 2005, pp. 1-13, N/A.

(Continued)

*Primary Examiner* — Idowu O Osifade
(74) *Attorney, Agent, or Firm* — Kilpatrick Townsend & Stockton LLP

(57) ABSTRACT

The present disclosure involves a computer-implemented unmixing algorithm that employs a least-square method involving image patches, and a computer-implemented unmixing or color deconvolution method that incorporates spatial smoothness and structure continuity constraints, for example, into a neighborhood graph regularizer, such as using a graph to enforce the pixel value similarities for those pixels in the same neighborhood.

19 Claims, 14 Drawing Sheets

(56) References Cited

OTHER PUBLICATIONS

International Preliminary Report on Patentability dated Feb. 7, 2017 in corresponding PCT/EP2015/067384 filed on Jul. 29, 2015, pp. 1-12.
International Search Report and Written Opinion dated Oct. 27, 2015 in corresponding PCT/EP2015/067384 filed on Jul. 29, 2015, pp. 1-14.
Junmin Liu et al, : "Enhancing Spectral Unmixing by Local Neighborhood Weights", IEEE Journal of Selected Topics in Applied Earth Observations and Remote Sensing, IEEE, USA, 2012, pp. 1545-1552, vol. 5, No. 5.
Zymnis A et al, "Hyperspectral Image Unmixing via Alternating Projected Subgradients",, Conference Record of the Forty-First Asilomar Conference on Signals, Systems & Computers, 2007, pp. 1164-1168, N/A.

* cited by examiner

Optimization

Let $$E = \sum_{i=1}^{N} \|y_i - Ax_i\|^2 + \lambda \sum_{i=1}^{N} \sum_{j=1}^{N} G(i,j) \|x_i - x_j\|^2$$

Expand the right hand side and get $$E(x_i) = \sum_{i=1}^{N} (y_i^T y_i + x_i^T A^T A x_i - 2y_i^T A x_i) + \lambda \sum_{i=1}^{N} \sum_{j=1}^{N} G(i,j) (x_i^T x_i = x_i^T x_j - 2x_i^T x_j)$$

Define the annotations and obtain

- $B_k = A^T A + 2\lambda (\Sigma_{i=k, j \neq 1} G(i,j) = \Sigma_{i \neq 1, j=k} G(i,j))/M \times M$,
- $X^T = [x_1^T, x_2^T, ..., x_N^T]$, and
- $b^t = [y_1^T A, y_2^T A, ..., y_N^T A]$, $$E = X^T \begin{pmatrix} B_1 & -2\lambda G(1,2)/_{M \times M} & \cdots & -2\lambda G(1,N)/_{M \times M} \\ -2\lambda G(2,1)/_{M \times M} & B_2 & \cdots & -2\lambda G(2,N)/_{M \times M} \\ \vdots & \vdots & \vdots & \vdots \\ -2\lambda G(N,1)/_{M \times M} & -2\lambda G(N,2)/_{M \times M} & \cdots & B_N \end{pmatrix} X - 2b^t X + \sum_{i=1}^{N} y_i^T y_i$$

FIG. 11A

Optimization $$E = X^T \begin{pmatrix} B_1 & -2\lambda G(1,2)I_{M\times M} & \cdots & -2\lambda G(1,N)I_{M\times M} \\ -2\lambda G(2,1)I_{M\times M} & B_2 & \cdots & -2\lambda G(2,N)I_{M\times M} \\ \vdots & \vdots & \cdots & \vdots \\ -2\lambda G(N,1)I_{M\times M} & -2\lambda G(N,2)I_{M\times M} & \cdots & B_N \end{pmatrix} X - 2b^T X + \sum_{i=1}^{N} y_i^T y_i$$

$$\text{c---> } \frac{\partial E}{\partial X} = (D^T + D) - 2b^T = 0$$

$$\text{c---> } (D^T + D)X = 2b^T$$

FIG. 11B

SYSTEMS AND METHODS FOR COLOR DECONVOLUTION

CROSS-REFERENCES TO RELATED APPLICATIONS

This patent application is a continuation of International Patent Application No. PCT/EP2015/067384 filed Jul. 29, 2015, which claims the benefit of U.S. Provisional Application No. 62/032,254 filed Aug. 1, 2014. Each of the above patent applications is incorporated herein by reference as if set forth in its entirety.

TECHNICAL FIELD

The present disclosure relates to color deconvolution of multicolor and/or multichannel brightfield and fluorescent multispectral images, for example, microscopic images. More particularly, the present disclosure involves a color deconvolution system and method that generates stain unmixing results for microscopic images, based on a tissue structure spatially smoothness constraint.

BACKGROUND

A multiplex histopathological (H&E, IHC) slide has the potential advantage of simultaneously identifying multiple biomarkers in one tissue section as opposed to single biomarker labeling in multiple slides. Therefore, multiplex IHC slides are often used for simultaneous assessment of multiple biomarkers in cancerous tissue. Typically, a tissue slide is stained by the multiplex assay. The stained slide is then imaged using a CCD color camera mounted on a microscope or a scanner to capture the three-channel RGB color image. The acquired RGB color image is a mixture of the underlying co-localized biomarker expressions. Equivalently, the slide can be imaged using a fluorescent multispectral microscope where the captured image is a multi-channel image with each channel corresponding to a different spectral filter image capture.

For example, cancerous tissue tumors often contain infiltrates of immune cells, which may prevent the development of tumors or favor the outgrowth of tumors. In this scenario, multiple biomarkers are used to target different types of immune cells and the population distribution of each type of them is used to study the clinical outcome of the patients. In multiplex staining of cancerous tissue slides, the biomarkers of the immune cells are stained by different chromogenic dyes. In order to conduct detection and classification of the cells, stain/color unmixing of the IHC digital image is performed to generate images that reflect the individual constituent stains for each biomarker and to obtain the proportion of each stain from three-channel color pixel values of the cellular structure in the captured image. This step is a prerequisite for any follow up IHC image analysis algorithms to detect cells of different biomarker types and quantify the stain concentration In the current literature, several techniques have been proposed to decompose each pixel of the RGB image into a collection of constituent stains and the fractions of the contributions from each of them. Ruifrok et al. developed an unmixing method called color deconvolution to unmix an RGB image, with up to three stains, in the converted optical density space. In this traditional deconvolution approach (i.e., Ruifrok's paper), shown in FIG. 1B, a linear equation $y_i = Ax_i$ is solved at each and every pixel i, to estimate $x_i$ where $y_i$ is the optical density transformed value of the observed RGB color value and $x_i$ denotes the vector of underlying stain proportions As $x_i$ only depends on $y_i$ and the reference vector A, solution at each pixel is independent of the solution at any other pixel in the image and thus can be solved for independent of other pixels. See Ruifrok, A C. and Johnston, D. A, Quantification of Histochemical Staining by Color Deconvolution, Anal. Quant. Cytol. Histol. 23, 291-299 (2001).

However, in multispectral unmixing or RGB unmixing, for example, where a tissue sample has been stained with multiple fluorescent stains or chromogen stains, there is a potential for imprecise knowledge of the spectral signature of the reference colors of individual stains and the inherent measurement noise in the camera capture, and Ruifrok's color deconvolution methodology may not adequately separate the unmixing components. Further, Ruifrok's method independently estimates the individual dye contributions at each pixel. Thus, Ruifrok's methodology may generate unmixed images having what appears as "holes and cracks" in the appearance of cellular structures in the unmixed images, which are biologically known to be spatially homogeneous and smooth varying. Often, these "holes and cracks" are due to the imprecise mathematical model of the physical process of image formation and noise in the imaging chain that affects the unmixed results.

Another unmixing method by Rabinovich et al. is known in the art, and it differs from Ruifrok's method in that it solves for the stain reference vectors, in addition to solving for the stain contributions at each pixel. See Rabinovich, Andrew, et al., Quantitative Spectral Decomposition for Stained Tissue Analysis, Proceedings of the University of California San Diego Research Expo (2005) p. 1-13. However, in terms of unmixing itself, Rabinovich's method is similar to Ruifrok's in that it unmixes each pixel independently Thus, like with Ruifrok's method, the tissue structural continuity is lost in the unmixed images and undesired noise or other artifacts may appear in the unmixed image results.

SUMMARY

The present disclosure is directed to image unmixing or deconvolution systems, apparatuses, and methods. In exemplary embodiments of the present disclosure, deconvolution systems and methods are disclosed that factor into consideration information regarding a pixel's neighborhood, which is obtained prior to unmixing, such that pixels that are identified as being spatial neighbors appear similar and should result in similar or smooth varying unmixed stain concentration images. In exemplary embodiments, the present disclosure involves simultaneous unmixing an entire image or portions of an image (e.g., patches) rather than unmixing individual pixels. Accordingly, tissue structures in an image have structural continuity and appear smooth. This differs from the prior art, such as Ruifrok's deconvolution method that may generate more unmixed images where structures appear more fragmented. In exemplary embodiments of the present disclosure, a spatial smoothness constraint within each pixel spatial neighborhood is utilized that incorporates information about the pixels in an image relative to information regarding other pixels, for example relative to the pixel's distance from other pixels.

The present disclosure also, in exemplary embodiments, involves solving the unmixing problem by adding a spatial smoothness constraint, such that structure (e.g., biological structure) spatial continuity is achieved. Cellular structures that are of interest and imaged in typical microscopic images are elliptical objects with major axis dimension approximately ranging from 5 microns to 40 microns, which translate to about 10 pixels to 80 pixels on a typical microscope image capture of 20× of pixel size around half a micron. Thus, the assumption is that pixel values within these cellular structures have similar stain concentrations and are not that different from each other. The present disclosure makes of use of this prior generic knowledge of the biological structures that are being imaged on the tissue slides to obtain better stain unmixing results. The constraint of the present disclosure involves determining, for each possible pair of pixels in an image or segment of a patch, whether the pixels are near each other (i.e., within or of a predetermined radial neighborhood or within a predetermined distance from each other, for example, in a 11×11 pixel neighborhood). If the pixels in the pair are determined to be near each other, then the pixels are considered spatially adjacent and/or neighbors. It is also assumed that the spatially nearby pixels have slowly varying unmixed values. Thus, if it is determined that the pixels of the pair are spatially adjacent or near each other, then the intensity difference between the unmixed values at these pixels is constrained to be small. Thus, the constraint of the present disclosure, accordingly, regulates the difference in the unmixed intensity values of the pixels in the pair is minimal. At the same time, to make sure that the unmixed solution at a pixel is as a result of and is dependent on the observed optical density vector at the pixel, the cost function that is minimized to obtain the solution is an additive combination of the observed data term and the smoothness constraint. Thus, the unmixed solution at each pixel is conditioned to be dependent on the solution of its spatial neighbors, which in turn are dependent on the unmixed solutions of their spatial neighbors. Thus, the unmixed solution at a single pixel is dependent on the solution of all other pixels in the image and thus the solution at all the pixels in the image need to be solved together and cannot be solved independently and pixel-wise as with existing methods. Consequently, the unmixed images appear more smooth and retain more spatial continuity (for example, the biological structures that appear in the unmixed images have structural continuity) than images unmixed by other known methods (e.g., methods that solve the linear system pixel-wise such as Ruifrok's and Rabinovich's). By involving a constraint, in exemplary embodiments of the present disclosure, structural information pertaining to cells, such as the structure of cells, nuclei, and/or membranes is retained.

In accordance with embodiments of the disclosure the step of simultaneously unmixing is performed using the following color deconvolution cost function $$X^* = \mathrm{argmin} \sum_{i=1}^{N} \|y_i - Ax_i\|^2 + \lambda \sum_{i=1}^{N} \sum_{j=1}^{N} G(i,j)\|x_i - x_j\|^2.$$

wherein N is the number of pixels in the set of pixels, y is a three-dimensional column pixel vector that represents the optical density values (O), M is the number of stains by which the biological specimen is stained, x is the combination weight vector of the stains, $x_m$, m=1, ..., M is the mth element of $x_i$, G is a neighborhood graph containing the neighbor data, wherein M is greater than 1, such as 3, preferably greater than the number of the color channels of the received image, using the same notation as in Structure Preserving Color Deconvolution for Immunohistochemistry Images, Ting Chen and Chukka Srinivas, Medical Imaging 2015: Digital Pathology, edited by Metin N. Gurcan, Anant Madabhushi, Proc. of SPIE Vol. 9420, 942004, the entirety of which being herein incorporated by reference. Each column of matrix A corresponds to a reference stain color and is obtained from a control slide of pure stain.

In accordance with embodiments of the disclosure G(i,j) of G is a binary weight, such as G(i,j)=1 if the pixels $p_i$ and $p_j$ are neighbors and G(i,j)=0, otherwise. In other words, G(i,j) is a step function.

In accordance with embodiments of the disclosure G(i,j) of G is a continuous weight, such as a continuous decaying function. In place of a binary weight (0 or 1), G(i,j) can be a continuous value to indicate weighted preference for certain neighbors over others; and neighbors in a certain orientation; or else which is a decaying function—with spatially closer neighbors having more weight than distant ones, like an exponential decay function, or a Gaussian function centered in the pixel of interest.

In accordance with embodiments of the disclosure, the step of simultaneously unmixing is performed using a Cholesky sparse linear optimization algorithm.

BRIEF DESCRIPTION OF THE DRAWINGS

FIGS. 11A and 11B illustrate a Cholesky's sparse linear optimization algorithm for solving the unmixing equation in accordance with the present disclosure.

DETAILED DESCRIPTION

The following detailed description refers to the accompanying drawings. The same reference numbers in different drawings may identify the same or similar elements. Systems, apparatuses, and methods of the present disclosure, relate to unmixing images of biological specimens that have been stained with stains or dyes (for example, chromogenic dyes, fluorescent stains, or quantum dots), while preserving the biological constraints of target structures, for example structures associated with targeted biomarkers. The subject disclosure presents systems and methods for preserving the specimen structure information, for example, local tissue structure information, when unmixing an image. The terms image and image data are used interchangeably herein.

Figure 1A:
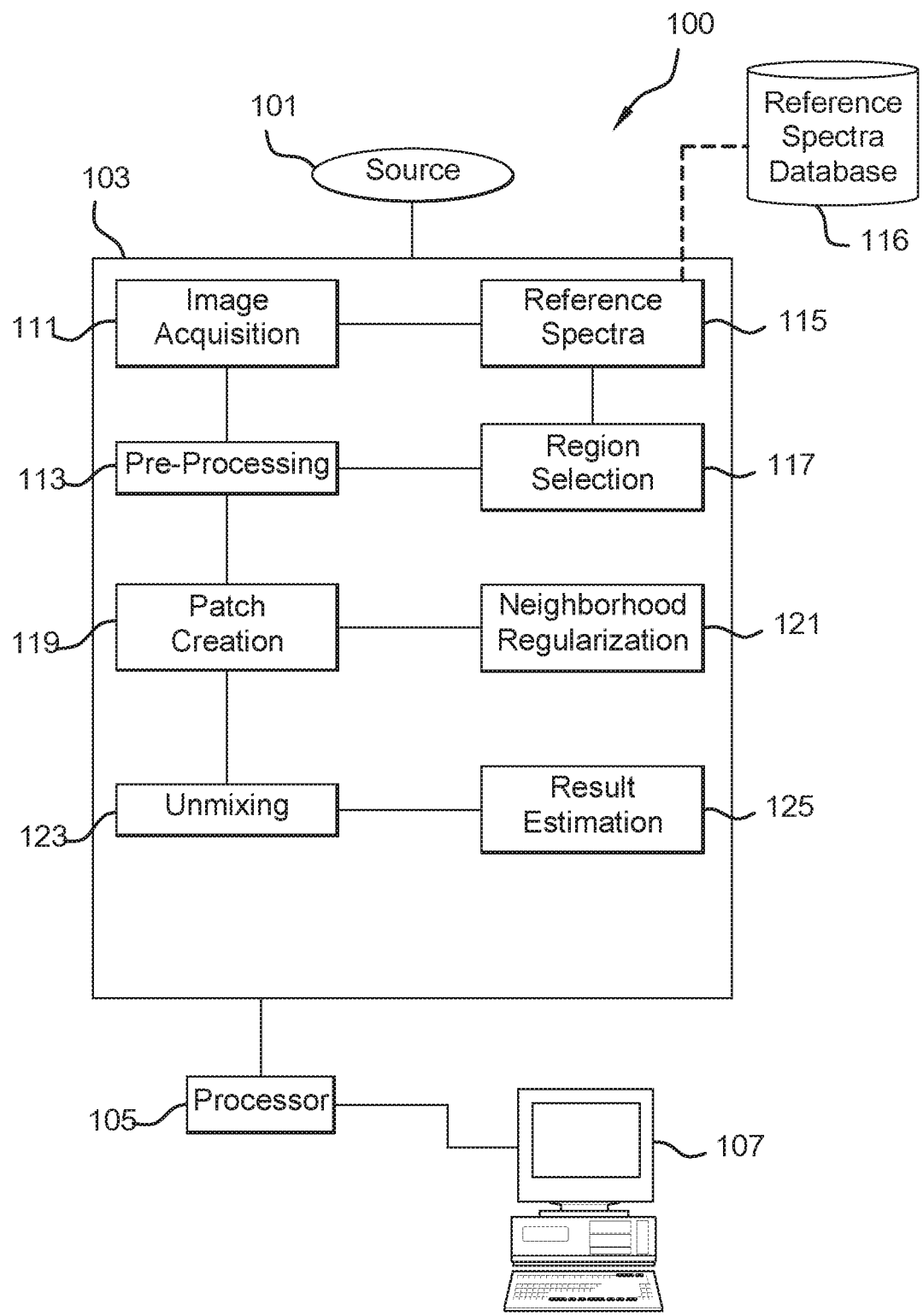
FIG. 1A illustrates a block diagram of image analysis system in accordance with the present disclosure.
Figure 1B:
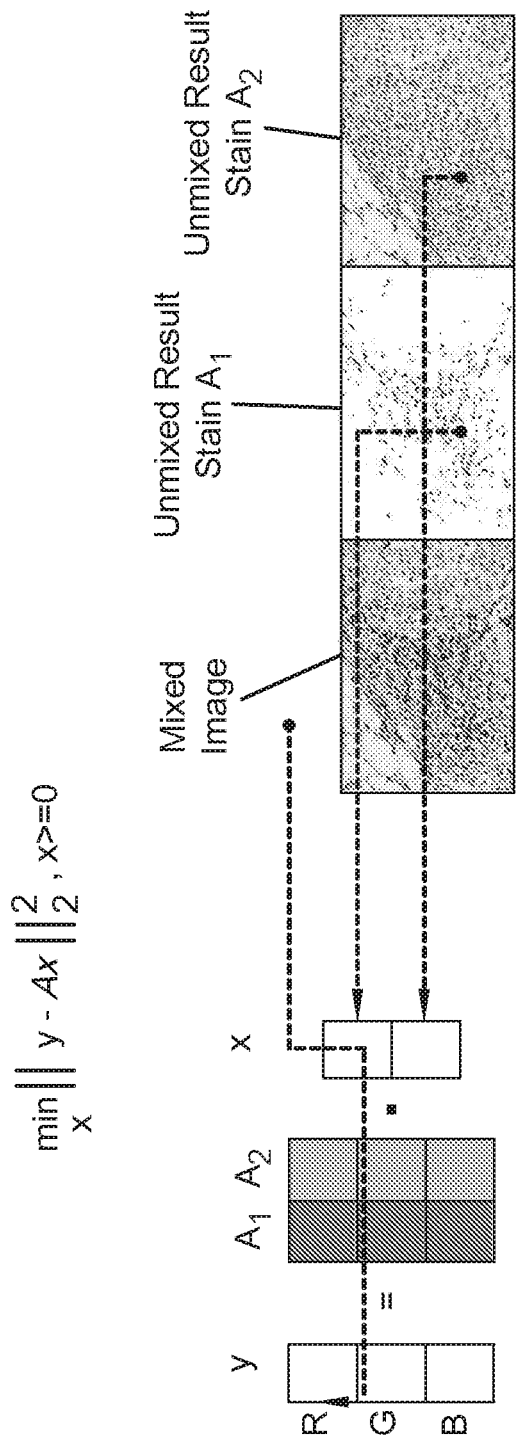
FIG. 1B illustrates Ruifrok's deconvolution method in the prior art.
Figure 1C:
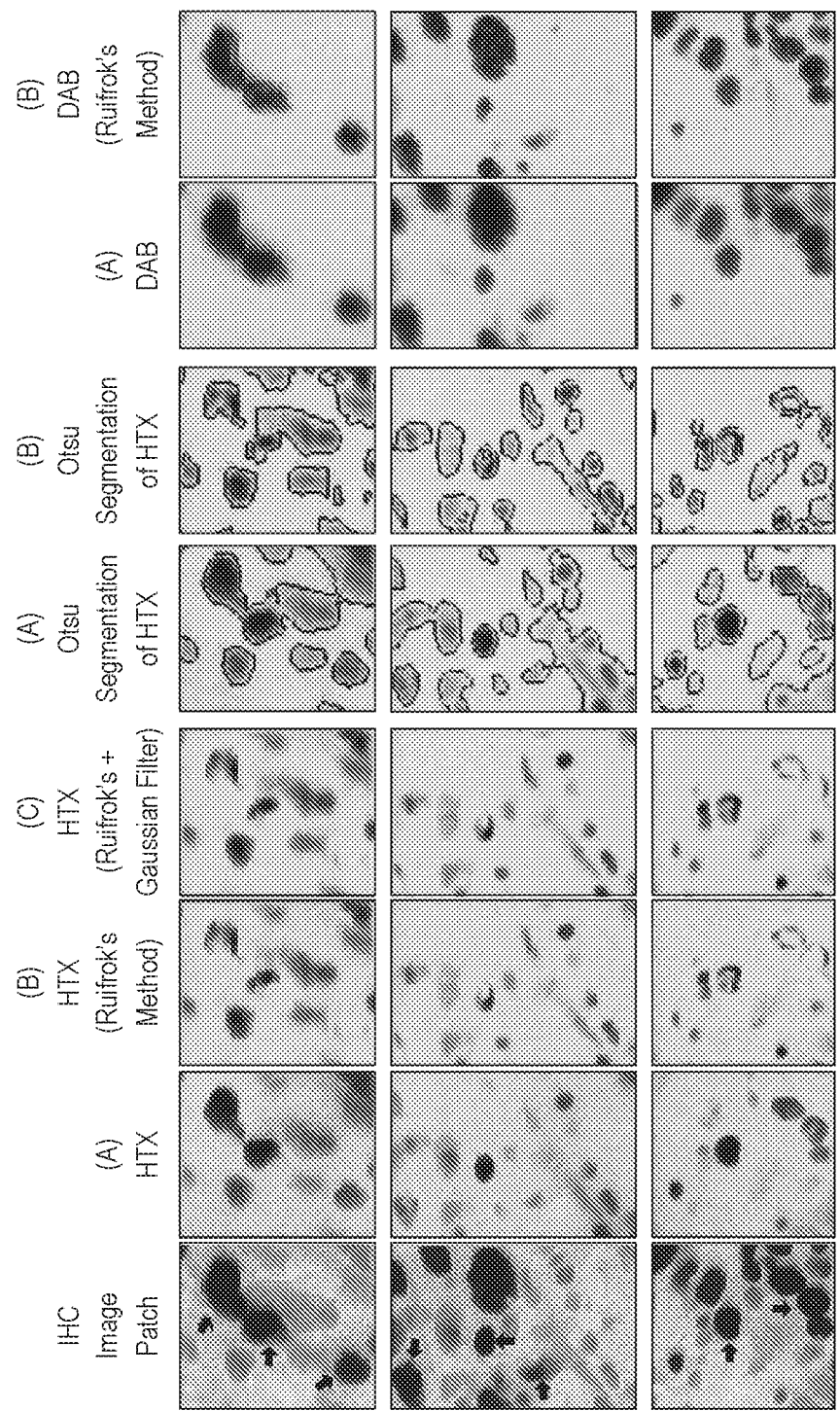
FIG. 1C illustrates a comparison of the unmixing results generated from methodologies of the present disclosure and methodologies using methods involving Ruifrok's algorithm.
Figure 2:
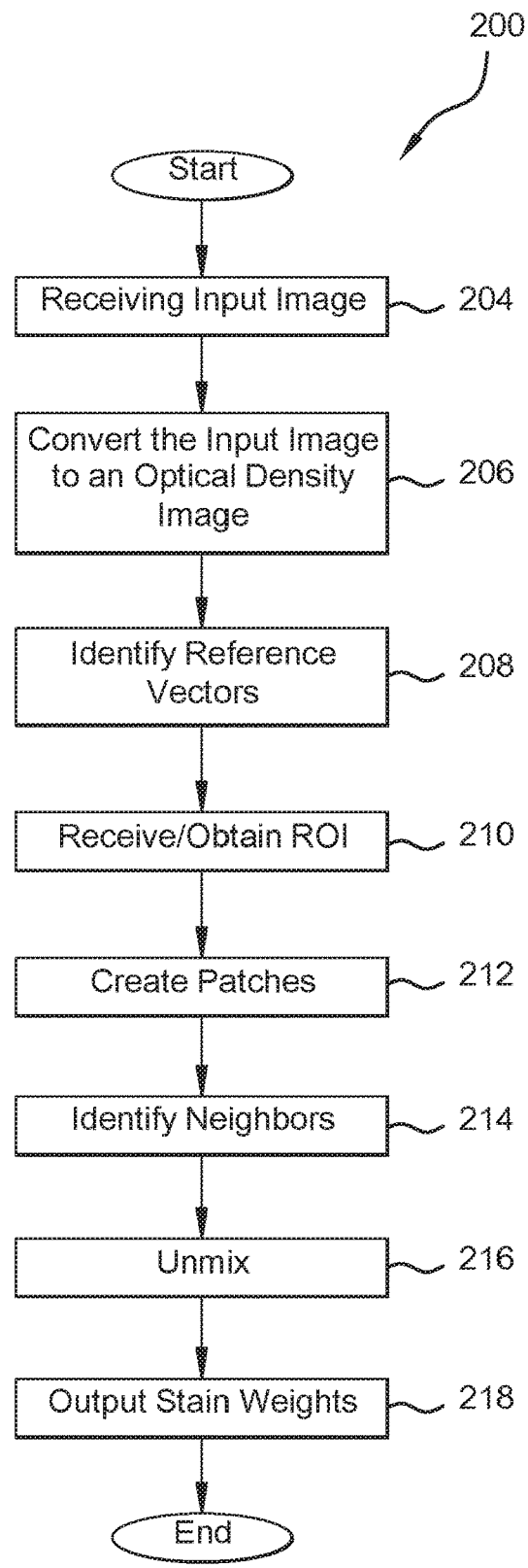
FIG. 2 illustrates flow chart of a method of unmixing in accordance with the present disclosure.

The color deconvolution method of the present disclosure has been evaluated on a clinical data set containing a number of DAB and (Hematoxylin) HTX stained IHC slides and as shown in FIG. 1C the disclosure of the unmixing method of the present disclosure demonstrates better unmixing denoted by (A) than results than Ruifrok's deconvolution \ unmixing equation alone (Ruifrok's result denoted as (B)), and even better than Ruifrok's method combined with a Gaussian filter (such results denoted by (C)). Also, Otsu's segmentation was applied to the unmixing results shown in the hematoxylin (HTX) channel of both unmixing results (A) of the present disclosure, and (B) of Ruifrok's methodology to segment the structures appearing in the HTX. While this disclosure may be described with respect to images of DAB and hematoxylin (HTX) stained IHC slides, the methods of the present disclosure may also be applicable to images of biological specimens (e.g., biological specimens stained with fluorescent and non-fluorescent dyes or stains (e.g., chromogenic dyes to identify targets, such as CD3, CDS, FoxP3) and other image types (e.g., ISH images). The terms unmixing and color deconvolution are used interchangeably herein.

The present disclosure is described, for exemplary purposes, in connection with cancerous tissue. However, the present disclosure is applicable to any biological specimen, for example a tissue specimen or cytology specimen, and/or applicable to biological specimens of any disease state (e.g., cancerous or non-cancerous). Additionally, one of ordinary skill in the art would recognize that the order of steps performed may vary.

FIG. 1A illustrates a system 100, for example, an imaging system for color unmixing (e.g., spectral unmixing) in accordance with an exemplary embodiment of the present disclosure. System 100 comprises a source 101 for generating a multi-channel image or multi-channel image data (for example, an RGB image or RGB image data and/or a multispectral image or multispectral image data). For instance, source 101 may be or include a fluorescence microscope, camera, optical, scanner, CCD, or imaging system that generates a fluorescent image, or a bright-field microscope, camera, optical scanner, or imaging system generating an RGB image, multispectral image, and/or RGB or multispectral image data. Examples of imaging systems can be, for example, any fluorescent or a brightfield microscope with spectral filter wheel or a whole slide scanner. Source 101 is in communication with a memory 103, which includes a plurality of processing modules or logical operations that are executed by processor 105 coupled to interface 107. For instance, a sample, such as a biological specimen, may be mounted on a slide or other substrate or device for purposes of imaging by a microscope, camera, scanner, CCD, or other optical system coupled to memory 103, with analysis of images of the specimen being performed by processor 105 executing one or more of the plurality of modules stored on memory 103 in accordance with the present disclosure. The analysis may be for purposes of identification and analysis of the specimen. For instance, a biological or pathological system may analyze the specimen for biological information, such as the presence of proteins, protein fragments or other markers indicative of cancer or other disease, or for other purposes such as genomic DNA detection, messenger RNA detection, protein detection, detection of viruses, detection of genes, or other.

The specimen, for example, a tissue specimen or cytology specimen may be stained by means of application of one or more different stains that may contain one or more different quantum dots, fluorophore(s), or other stains. For example, in a fluorescent slide, the different stains may correspond to different quantum dots and/or fluorophores. The fluorophores may comprise one or more nano-crystalline semiconductor fluorophores (e.g., quantum dots), each producing a peak luminescent response in a different range of wavelengths. Quantum dots are well known, and may be commercially available from Invitrogen Corp., Evident Technologies, and others. For example, the specimen may be treated with several different quantum dots, which respectively produce a peak luminescent response at 565, 585, 605, and 655 nm. One or more of the fluorophores applied to the specimen may be organic fluorophores 14 (e.g., DAPI, Texas Red), which are well known in the art, and are described in at least commonly-owned and assigned U.S. Pat. No. 8,290,236, the contents of which are incorporated by reference herein in their entirety. Moreover, a typical specimen is processed utilizing a staining/assay platform, which may be automated, that applies a stain, for example, a stain containing quantum dots and/or organic fluorophores to the specimen. There are a variety of commercial products on the market suitable for use as the staining/assay platform.

After preliminary tissue processing and staining, one or more digital images of the specimen may be captured at source 101 via, for instance, a scanner, CCD array spectral camera, or other imaging system that is used for imaging a slide containing a sample of a material, and generate a digital image of the sample on the slide. The slide containing the sample is subjected to a light source for illuminating the specimen at wavelengths intended to produce a luminescent response from the stain applied to the specimen. In the case of quantum dots, the light source may be a broad spectrum light source. Alternatively, the light source may comprise a narrow band light source such as a laser. An RGB brightfield image may also be captured. The imaging system may include, for example, a digital camera, a microscope or other optical system having one or more objective lenses, and light sources, as well as a set of spectral filters. Other techniques for capturing images at different wavelengths may be used. Camera platforms suitable for imaging stained biological specimens are known in the art and commercially available from companies such as Zeiss, Canon, Applied Spectral Imaging, and others, and such platforms are readily adaptable for use in the system, methods and apparatus of this subject disclosure. The image may be supplied to memory, or storage device 103, either via a wireless or wireline connection, for example, a cable connection between the source 101 and computer 107, via a computer network, or using any other medium that is commonly used to transfer digital information between computers. The image may also be supplied over the network to a network server or database for storage and later retrieval by computer 107. Besides processor 105 and memory 103, computer 107 also includes user input and output devices such as a keyboard, mouse, stylus, and a display/touchscreen. As will be explained in the following discussion, processor 105 executes modules stored on memory 103, performing analysis of the image, of the image or image data derived from such images, quantitative analysis, and display of quantitative/graphical results to a user operating computer 1.

Modules stored on memory 103 include image acquisition module 111, a pre-processing module 113, reference spectra module 115, a reference spectra database 116 for storing reference spectra data, a region or FOV selection module 117, a patch creation module 119, a neighborhood regularization module 121, an unmixing module 123, and result determination or estimation module 125. A "module" as understood herein encompasses a program module that comprises instructions that are executable by a processor. The operations performed by these modules are not limited to those described herein, and the sequence, arrangement, and total number of modules may vary, with the presently described embodiment being solely for example purposes.

For instance, the image acquisition module 111 receives an input image or image data from the source 101. The pre-processing module 113 converts the image into the optical density space, as the step of unmixing, performed by the unmixing module 123, is computed on the optical density version of the input image. The reference spectra module 115 obtains the reference spectra data, for example the RGB and/or spectral reference data, as the step of unmixing, performed by the unmixing module 123, involves utilizing the reference spectra data. In an exemplary embodiment of the present disclosure, the reference spectra data is retrieved form a reference spectra database 116. The region selection module 117 receives, obtains, or generates a region of interest (ROI), a field of view (FOV), or identifies a portion of input image or corresponding optical density version of the input image. Regions may be defined based on structures or features observed in the image. The region selection module 117 enables automated or manual delineation of the image into one or more regions. The patch creation module 119 creates or obtains patches for the input image or the optical density version of the input version of the input image. The patch creation module divides the region of interest into patches of the same size. In exemplary embodiments of the present disclosure the patches are 128 pixels by 128 pixels. However, the patches may be of any size. The neighborhood regularization module 121 receives information corresponding to a size of a neighborhood, and for each pair of pixels in the patch, the neighborhood regularization module determines if the pair of pixels are neighbors. The unmixing module 123 simultaneously unmixes (i.e., utilizes a single equation to solve for the weights of each stain) in an image or a portion of an image, based on information about whether pairs of pixels neighbors. Separate operations may be executed in parallel on different images, different regions of an image or images, and/or different patches of an image or images, enabling efficient processing of a single image or multiple images, for example, one or more images of multiplex stained slides, for example, chromogen or fluorescent stained slides.

The result estimation module 125 receives the unmixed results for an input images or one or more of the patches, and/or outputs the unmixed results for the image, or portions thereof, to a user interface or display, for example, a display associated with computer 107.

As described above, the modules include logic that is executed by processor 105. "Logic," as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from computer-executable instructions stored on a non-transitory computer-readable medium such as memory or storage 103, which includes including random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

An exemplary system and method of unmixing 200, in accordance with the present disclosure involves, in step 204 receiving an input image (e.g., by the image acquisition module 111), such as, an RGB image or multispectral image, from a source. In step 206, a step of pre-processing is performed by, for example, the pre-processing module 113, and involves converting the pixel intensity information associated with each pixel of the input image to optical density information, and an optical density image is generated based on the input image. In step 208, a set of reference vectors is determined or received for each stain by, for example, the reference spectra module 115. The reference vectors correspond to the color or spectral data that defines a stain (e.g., for example according to its color or spectrum component contributions), such that a stain can be identified as present in an image according to whether a color (e.g., indicative of a stain) that appears in an image matches or deviates, within a pre-determined range, from the reference color vector or stain color vector values. For example, for RGB images, the reference color vectors correspond to RGB values that define what is sometimes referred to as the true stain or the pure stain. It should be understood that the order of the steps of the prior disclosure may vary, as, for example, the reference color vector or vectors may be identified at any time up to and including the unmixing step.

In step 210, a region of interest (ROI) or field of view (FOV) corresponding to a portion of the image is identified in the optical density version of the input image. Alternatively, the ROI may be identified in the input image and registered in the optical density version of the image or optical density image. In exemplary embodiments of the present disclosure, the regions of interest location may be stored in memory and obtained by, for example, the region selection module 117, and applied to the input image or optical density image. In exemplary embodiments of the present disclosure, the regions of interest or field of view are automatically determined. In exemplary embodiments of the present disclosure the fields of view are automatically determined according to the method or methods disclosed in PCT/EP2015/062015 and U.S. Provisional Patent Application Ser. No. 62/005,222 of 30 May 2014, which are hereby incorporated by reference in their entirety. In exemplary embodiments of the present disclosure, an input is received from a user correlating to a desired region of interest or the FOV by, for example, the region selection module 113. In another exemplary embodiment of the present disclosure, the region identification step is skipped, as the unmixing is performed on an entire image or portion thereof.

In step 212, the optical density image is divided by, for example, the patch creation module 119, into patches, for example, segments or portions of the region of interest. Alternatively, the patches are created for the input image and registered in the optical density image. In exemplary embodiments of the present disclosure, the patches are 128 pixels by 128 pixels. However, the patches can be of any one size or shape, or vary in size and shape. In another exemplary embodiment of the present disclosure, the input image or the optical density image is divided into patches, as the unmixing method of the present disclosure is performed an entire input image or portion thereof with or without dividing the images into patches.

In step 214, it is determined by, for example, the neighborhood regularizer/regularization module 121, whether, for each possible pair of pixels in the image or portion thereof (e.g., a patch), the two pixels are near, within a predefined distance, or in the neighborhood of each other. The size of a neighborhood is predetermined by a user, and received and or obtained from, for example, storage, by the neighborhood regularizer module 121. In an exemplary embodiment of the present disclosure, the neighborhood size is a 3×3 pixel area. However, the size of the neighborhood may be of any size or shape. In an exemplary embodiment of the present disclosure, when the two pixels of a pair are in the neighborhood or distance of each other (e.g., of or within the 3×3 pixel area), the neighborhood regularizer 121 associates the pair with a data value, for example the value of one (1). When the two pixels of a pair are not within a neighborhood or predetermined distance from each other, the neighborhood regularizer 121 associates a different data value with the pair of pixels, for example, the value zero (0). The neighborhood data is stored in memory for each of the pair of pixels of each of the patches, and is utilized during the unmixing step.

In step 216, the image or portion thereof (e.g. patch) is selected to be unmixed by, for example, the unmixing module 123. In another exemplary embodiment of the present disclosure, the unmixing module receives information regarding a portion of the image, such as patch, to be unmixed. In step 216, the weight of each stain at each pixel in the patch is determined using a single equation, and thus, the weight of each stain for each pixel in the patch is determined via solving one equation, and thus, simultaneously. The unmixing method of the present disclosure differs from Ruifrok's method as the unmixing method of the present disclosure unmixes pixels as a group, and does not separately unmix each pixel, as performed in accordance with Ruifrok's method.

In step 218, the results determination module outputs the weight of each stain at each pixel or an estimation of the weight of each stain at each pixel. In an exemplary embodiment of the present disclosure, if the portions of an image are unmixed, rather than an entire image, the results estimation module concatenates or combines the results generated from the unmixing of each portion, and outputs the combined or concatenated unmixing results.

Figure 3:
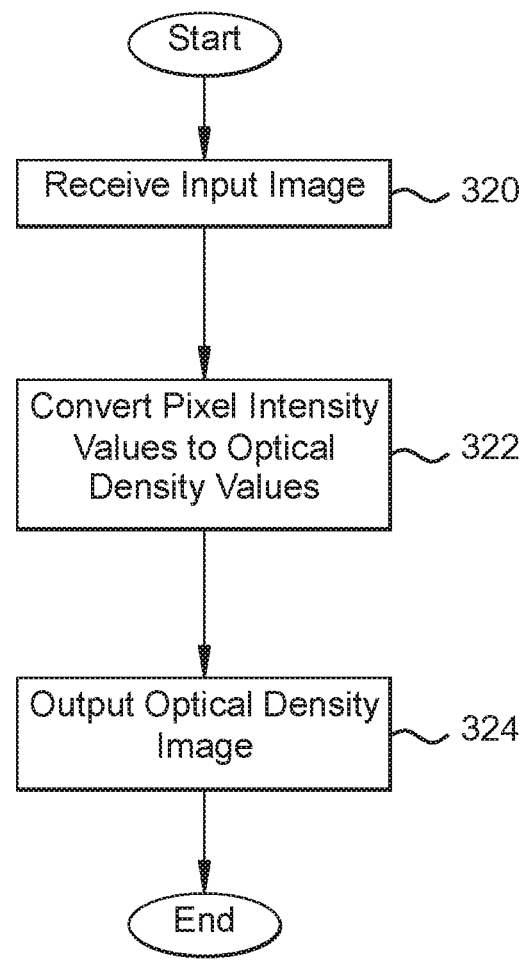
FIG. 3 illustrates a flow chart of a method for pre-processing an image in accordance with the present disclosure.

Shown in FIG. 3 is a flowchart illustrating the steps of the pre-processing module 113. In step 320, the input image is received by the pre-processing module. In step 322, the pixel intensity values in the input image or portion thereof are converted to optical density values. To convert the input image to the optical density space, the input image, for example, an RGB image is log transformed to construct a corresponding three dimensional optical density image using the formula $O_c=-\log_{10}(I_c/I_{0c})$. $I_c/I_{0c}$ is the fraction of the light incident that penetrates through the specimen or sample without being absorbed or scattered. This optical density formula is derived from Beer's law that is based on the fact that the optical density is proportional to the stain contributions. Here, c is the index of the RGB color channels, and $I_c$ is the pixel intensity value for a particular pixel in a single color channel or the intensity of the transmitted light beam. $I_0$ is the value, for example, the RGB value, of the white points (i.e., the value of what constitutes the color white and/or background for the image) or the intensity of the incident light beam. In exemplary embodiments of the present disclosure, $O_c$, the OD value, is computed for each pixel in each of the color channels, for example, for each pixel in each of the RGB color channels. For example, for an input RGB image having i pixels, the optical density vector, $O_c$, is represented by $(y_r, y_g, y_b)$ at pixel i. In step 324, $O_c$ is output to, for example, the unmixing module 123, a display of the computer 107 and/or storage 103.

Figure 4:
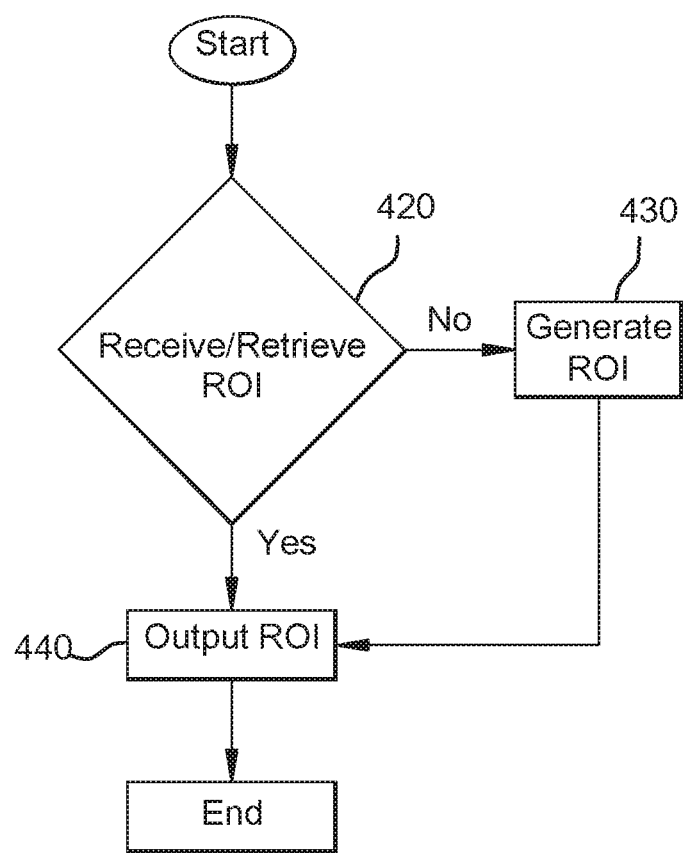
FIG. 4 illustrates a flow chart of a method for region selection in accordance with the present disclosure.

Shown in FIG. 4 is a flow chart illustrating the region selection, for example, by region selection module 117. In step 420, the region selection module receives an identified region of interest or field of view. For example, in exemplary embodiments of the present disclosure, the region of interest is identified by a user of a system of the present disclosure, or another system electrically coupled, via wireless or wireline, to a system of the present disclosure. Alternatively, in exemplary embodiments of the present disclosure, the region selection module 117, retrieves a location or identification of a region or interest from a storage/memory. In an exemplary embodiment of the present disclosure, as shown in step 430, the region selection module 117 automatically generates an FOV or ROI, for example, via methods described in the above referenced PCT application PCT/EP2015/062015 and U.S. Provisional Patent Application Ser. No. 62/005,222, which are herein incorporated by reference in their entirety. In another exemplary embodiment of the present disclosure the region of interest is automatically determined by the system based on some predetermined criteria or characteristics that are in or of the image. In step 440, the region selection module 117 outputs the ROI. In exemplary embodiments of the present disclosure, the region of interest selection module 117 outputs the region of interest to the patch creation module 119, the unmixing module 123, and/or to a display of the computer 107. In another exemplary embodiment of the present disclosure the region of interest module 117 generates or applies one or more annotations, colors and/or other identifying marks to the region of interest output on the display of the computer 107. In another exemplary embodiment of the present image, the region selection step is skipped when a whole image or portion thereof is unmixed in its entirety.

Figure 5:
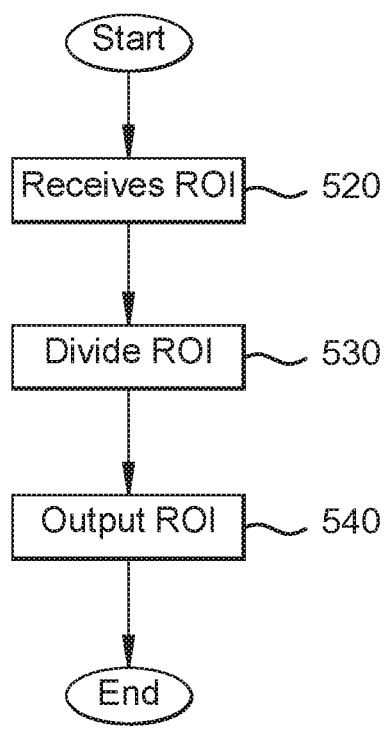
FIG. 5 illustrates a flow chart of a method for dividing an image into portions.
Figure 6:
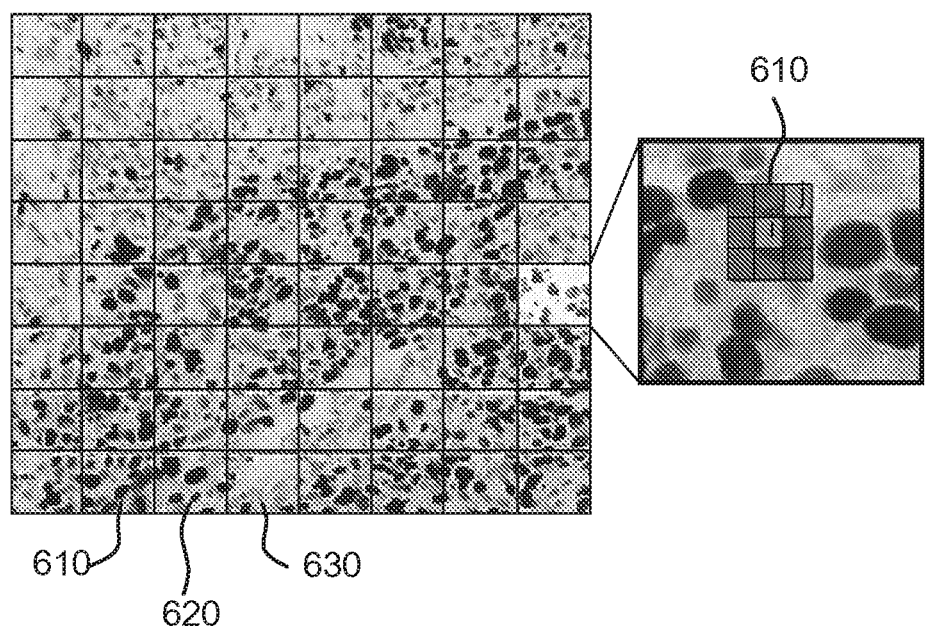
FIG. 6 illustrates an image divided into patches in accordance with the present disclosure.

Shown in FIG. 5, is a flow chart illustrating the patch creation module. In step 520, the patch creation module receives the region of interest. In another exemplary embodiment of the present disclosure, the patch creation module receives an input image. In step 530, the patch creation module divides the region of interest into patches, i.e., segments smaller in size that the received input image or portion thereof. In exemplary embodiments of the present disclosure the width of the patch is equal to the length of the patch. However, the patch length, width, and shape may vary. In an exemplary embodiment of the present disclosure, the patch size is 128 pixels×128 pixels patch. In step 540, the patch creation module outputs one or more patches to a storage unit (e.g., a memory) and/or the unmixing module 123. Shown in FIG. 6, an image is divided into patches 610, 620, 630. Alternatively, the step of creating patches is skipped and the unmixing is performed on a whole image or a portion thereof, in its entirety.

Figure 7:
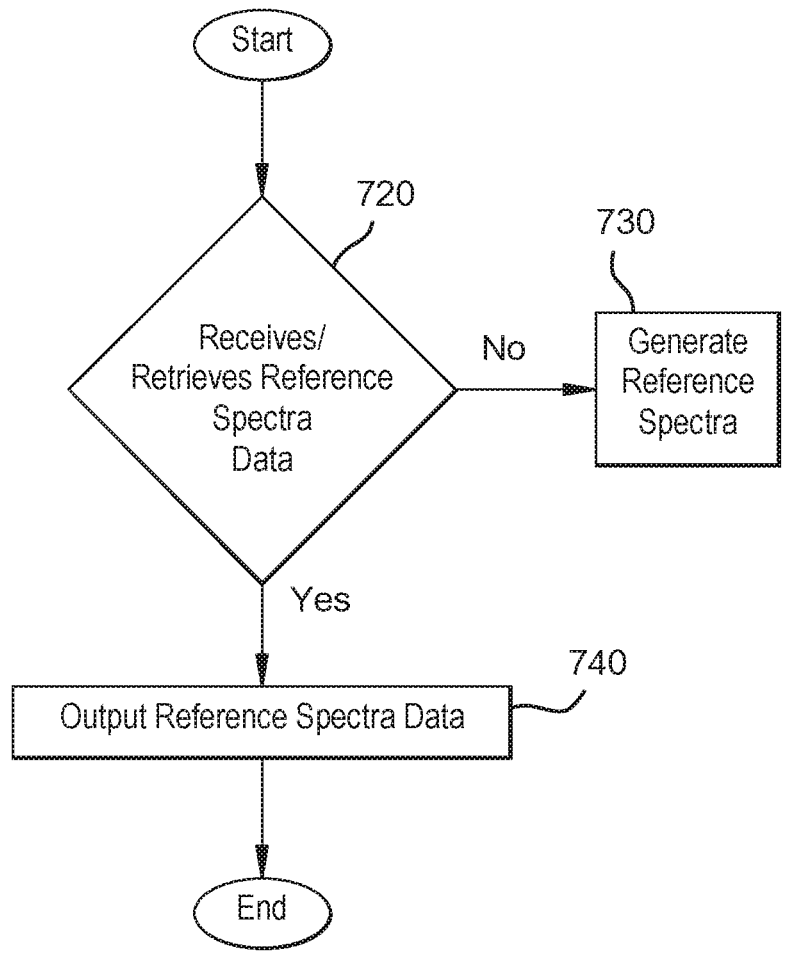
FIG. 7 illustrates a flow chart of a method of obtaining or retrieving reference spectra in accordance with the present disclosure.

Shown in FIG. 7, is a flowchart illustrating the step of obtaining reference spectra data, for example, by the reference spectra module 115. In step 720, the reference spectra module receives reference spectra data, for example reference color vector or reference stain vector data, so that an imaged is unmixed into the channels corresponding to the reference colors or reference stains. In an exemplary embodiment of the present disclosure reference spectra data is obtained from reference spectra database 116. In step 730, if the reference spectra data is not retrieved, the reference spectra module generates reference spectra data, for example, according to the methods described in International Application No. PCT/EP2014/055028, entitled SPECTRAL UNMIXING, which is hereby incorporated by reference in its entirety. In step 740, the reference spectra data is output, for example to the unmixing module 123 and/or a display of the computer 107.

Figure 8:
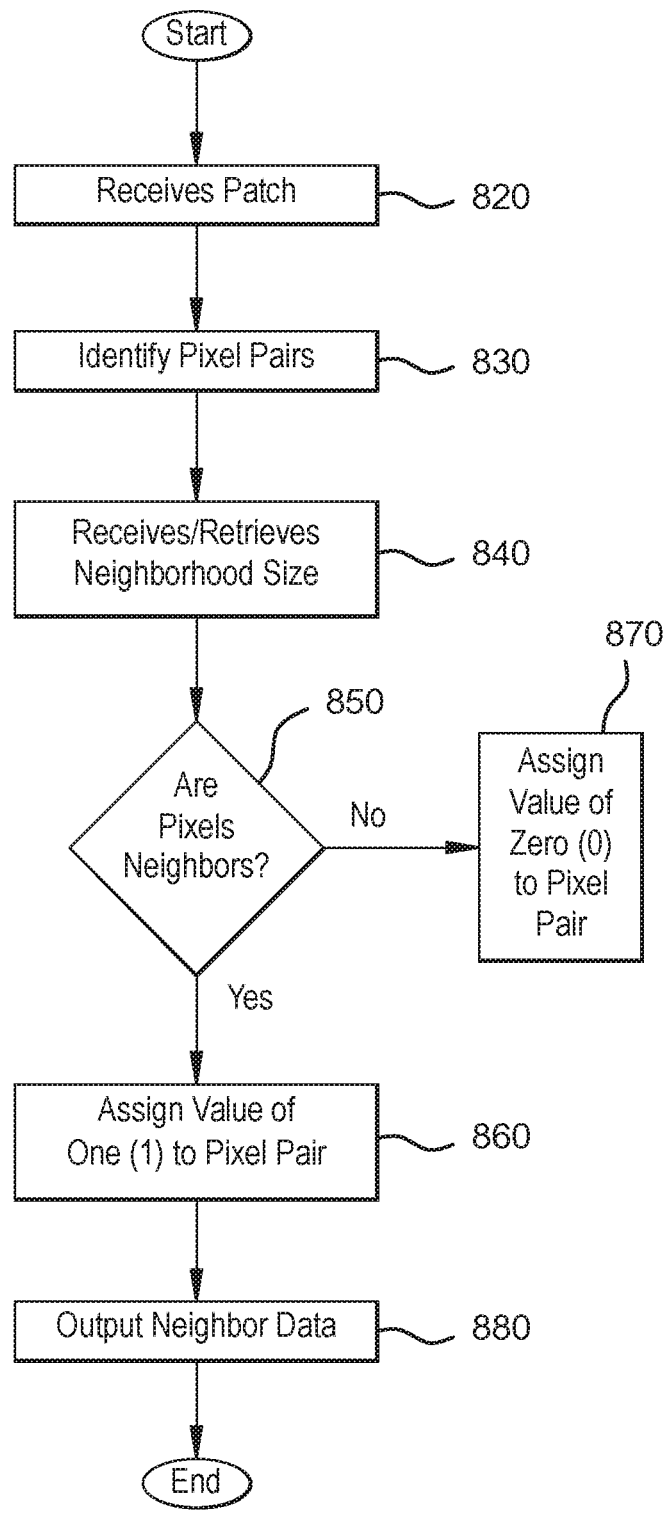
FIG. 8 illustrates a flow chart of a method for generating a neighborhood regularizer and neighbor data in accordance with the present disclosure.

Shown in FIG. 8, is a flow chart illustrating a method for generating a neighborhood regularizer, by, for example, the neighborhood regularization module 121. In step 820, the neighborhood regularization module 121 receives the optical density image or portion thereof (e.g., a patch). In step 830, the neighborhood regularization module 121, identifies or determines possible pixel pairs in the image, for example, all of the possible pixel pairs in an image or portion thereof. In step 840, the neighborhood regularization module 121 receives or retrieves a neighborhood size. In an exemplary embodiment of the present disclosure, the neighborhood size data or neighborhood definition is received from a user input. In another exemplary embodiment of the present disclosure, the neighborhood size is retrieved from a storage or memory. In an exemplary embodiment of the present disclosure, the neighborhood size is three (3) pixels by three (3) pixels. However, the size of the neighborhood may vary in size, both in width and/or height, and shape. In step 850, the neighbor regularization module 121, for example, applies the neighborhood definition to one or more pairs of pixels in the patch and determines whether the pixels of a pair of pixels are neighbors according to the neighborhood definition. Pixels within or of a neighborhood (i.e., within a predetermined radial distance from each other based on, for example, their pixel locations) are considered neighbors, and, consequently, are presumed to have an unmixed solution with a minimal difference.

In step 860, in an exemplary embodiment of the present disclosure, if the pixels of a pixel pair are determined to be neighbors, i.e., close or near to each other according the predefined neighbor definition or constraint, a value or other indicator is associated with the positive result. In step 860, in an exemplary embodiment of the present disclosure, a value of one (1) is associated with the pixel pair when the pixels of the pair are determined to be neighbors. In step 870, in an exemplary embodiment of the present disclosure, if the pixels of the pixel pair are determined as not neighbors, i.e., not close or near to each other, according the predefined neighbor definition or constraint, a value or other indicator is associated with the negative result. In an exemplary embodiment of the present disclosure, a value of zero (0) is associated with the pixel pair if the pixels of the pair are determined as not neighbors. In an exemplary embodiment of the present disclosure, the neighbor data (i.e., data representing whether pixels of a pair are neighbors) is, for example, represented or formatted as a graph, database, and/or table, and stored in a storage. However, the neighbor data may be represented or stored in other formats.

Figure 9:
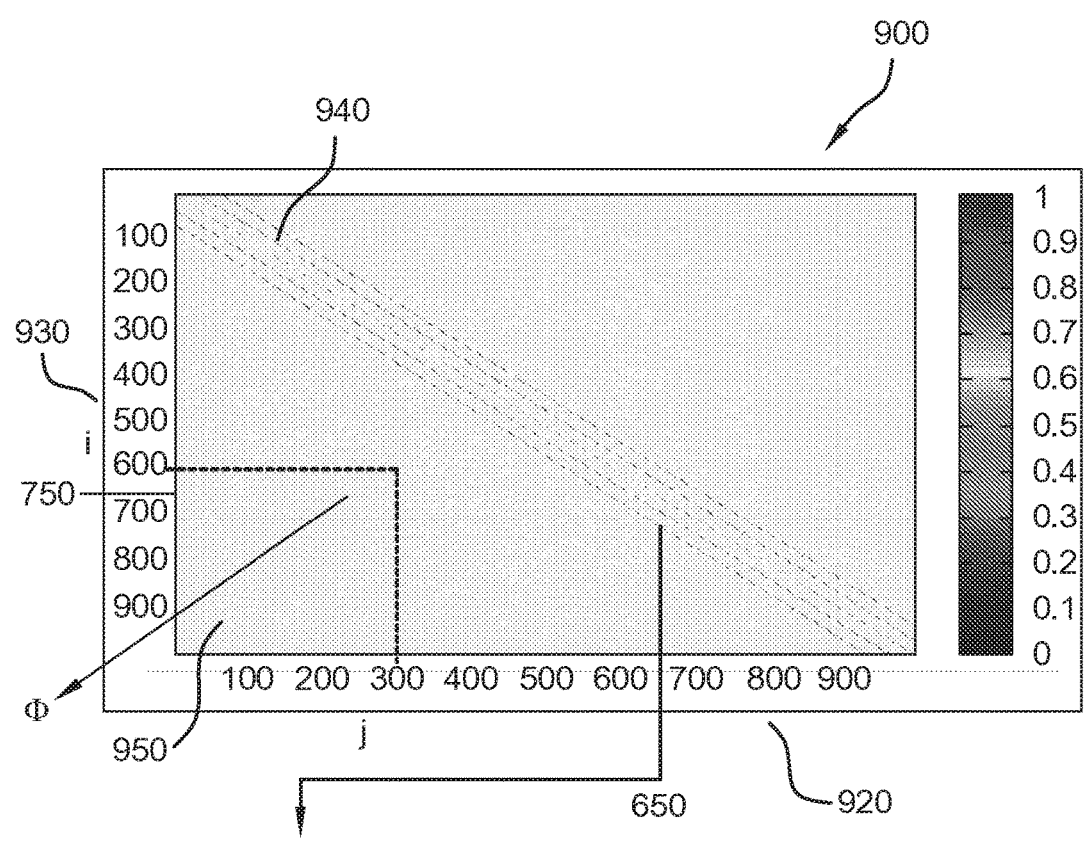
FIG. 9 illustrates a graphical representation of neighbor data in accordance with the present disclosure.

Shown in FIG. 9, is a graphical representation 900 of neighbor data. The x axis 920 is representative of the pixels in a patch, for example, all of the pixels in a patch. Similarly, the y axis 930 is representative of the pixels in the patch, for example, all of the pixels in a patch. Accordingly, every possible pair of pixels, for example, pixels (i,j), in a patch is or can be identified in the graph 900. The sloped lines or bands 940 identify pixels that are in the same neighborhood, i.e., pixels that are of or within the predetermined pixel neighborhood, and thus, within a predefined distance of each other. For a 3×3 neighborhood around a pixel, for example, the pixels are considered neighbors to the pixel if the spatial difference between the pixel to any pixel in the neighborhood is less than or equal to 2 pixels.

FIG. 9 depicts the neighbor data in a graphical form. For example, when plotted, a pair of pixels (i, j) can be represented as a point in the graph 900. When the pixels of the pair are neighbors, the point in the graph, representative of the pair of pixels, will intersect the bands 940. When the pixels of the pair of pixels are not neighbors, the point, representative of the pair, when plotted, does not intersect a point on the lines or bands 940, but instead falls on a non-band point or location (e.g. the plotted point falls in area 950.

As an example, shown in FIG. 9, is a graph representative of a 30×30 pixel patch. In a 30×30 pixel patch, there are 900 pixels. Each pixel is assigned a number from 1-900. As shown in FIG. 9, when the pixel pair (i, j) (where pixel i=pixel 600 and pixel j=pixel 300) is plotted, the point on the graph corresponding to the pair of pixels does not intersect one of the lines 940. According to an embodiment of the present disclosure, this non-neighbor result or negative result is assigned a value of zero (0). As illustrated in FIG. 9, when the pixel pair (i, j), where pixel i=pixel 700 and pixel j=pixel 650, is plotted, the plotted point does intersect one of the bands 940, and in accordance with the present disclosure, is assigned a value indicative of the positive neighbor association, for example, a value of one (1). In an exemplary embodiment of the present disclosure, the neighbor data (i.e., data representing whether pixels of a pair are neighbors) is stored and/or presented in table, database, or other format.

Figure 10:
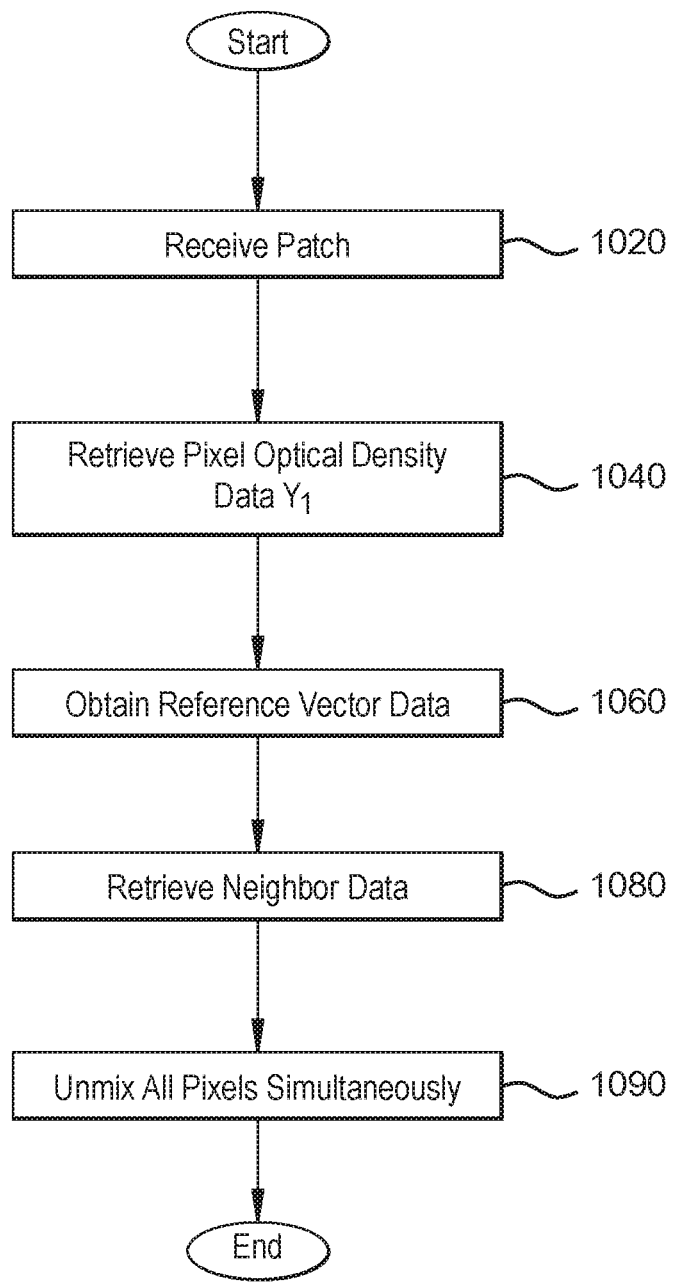
FIG. 10 illustrates a flowchart of a method of unmixing in accordance with the present disclosure.

FIG. 10 illustrates a method of unmixing in accordance with the present disclosure. In step 1020, an image or portion thereof (e.g., patch) is received by unmixing module 123. The unmixing module 123 of the present disclosure involves utilizing equation (1) or (2) below to solve for the weight of each stain at each pixel in the patch simultaneously. The unmixing equations (1) and (2) below, in accordance with the present disclosure, is solved for each color channel in the image at the same time, and determines the weight of each stain at a pixel, i.e., at each pixel i through N. Thus, the unmixing equation of the present disclosure solves for the weight of each stain at each pixel in the patch simultaneously, i.e., by applying the equation once to the image data associated with the pixels in an image or portion thereof (e.g., patch). Accordingly, based on the unmixing results, individual channel images are generated that correspond to a particular color or stain in the image, for example, a microscopic image of a biological specimen, such as a tissue specimen. The following steps describe an exemplary embodiment for retrieving and/or obtaining the image data to solve the unmixing equation or equations of the present disclosure.

$$X^* = \mathrm{argmin} \sum_{i=1}^{N} \|y_i - Ax_i\|^2 + \lambda \sum_{i=1}^{N} \sum_{j=1}^{N} G(i, j)\|x_i - x_j\|^2., \quad (1)$$

where $$E = \sum_{i=1}^{N} \|y_i - Ax_i\|^2 + \lambda \sum_{i=1}^{N} \sum_{j=1}^{N} G(i, j)\|x_i - x_j\|^2. \quad (2)$$

In step 1040, the optical density data is retrieved $y_r$. In exemplary embodiments of the present disclosure $y_r$ represents the optical density vector at pixel i, for example, for an RGB image, $(y_r, y_g, y_b)$ is retrieved. For N pixels, there are N optical density vectors that will be input as a matrix in the unmixing equation of the present disclosure. If there are N pixels and C color channels, the $y_r$ matrix will have N rows and C columns.

In step 1060, the reference vector data for the colors or stains that were applied to the biological specimen, before it was imaged, are obtained or retrieved from, for example, the reference spectra module 115 or the reference spectra database 116.

A corresponds to the matrix of reference vector or vectors. The reference vector corresponds to the pixel intensity values in each of the color channels that define or characterize the color channel to be unmixed. In an exemplary embodiment of the present disclosure, the color channel to be unmixed corresponds to a stain color, and A corresponds to the color contributions that define or characterize the stain color to be unmixed. For example, for an RGB image, a stain color corresponds to an amount of red, green, and blue. Accordingly, a stain reference vector has values for each of the three components (i.e., a red, green, and blue value), which, when combined, generate the reference stain color (sometimes referred to as the true or pure stain color).

The reference stain vectors is the basis of unmixing, as after an image is unmixed, the unmixed image data is presented into separate channels that correspond to each of the stain colors. If, for example, there are two stains that appear in an input RGB image, A corresponds to a matrix having a number of rows that correspond to the number of stain colors present in the image, and having a number of columns that correspond to the number of color components that generates the appearance of the stain color in the image.

In step 1080, neighbor data is retrieved. G (i,j) represents the neighbor data, and corresponds to a neighborhood matrix G that specifies the spatial neighborhood data that was obtained or retrieved. The G matrix is an N×N matrix for i through N pixels in the image where the pixels are ordered in a raster-scan manner. In the G matrix, the ith row represents the spatial neighborhood of pixel i and similarly the jth column corresponds to pixel j. Thus, the element G(i,i) refers to pixel i itself. G(i,j) refers to the neighborhood relation between pixel i and pixel j. G(i,j) is set to 1 if pixel i and pixel j are neighbors. For example, if a 3×3 pixel area is defined as a spatial neighborhood around a pixel, then the spatial neighborhood for that pixel corresponds to nine pixels. Accordingly, in any row, corresponding to a pixel, the nine column entries of the G, which correspond to the neighboring pixels, matrix will be non-zero. Mathematically, the G matrix is a symmetric and a sparse banded matrix, meaning only a few neighboring pixels around each pixel are non-zero. According to matrix theory, a band matrix is a sparse matrix whose non-zero entries are confined to a diagonal band (see FIG. 6). In exemplary embodiments of the present disclosure, the element value G(i,j) is set to a value of 1 if they are spatial neighbors, and set to 0 otherwise.

In images of biological specimens, for example, IHC images, the pixel values correspond to the stain intensities of tissue structures (e.g., cells, glandular regions, connected tissue, etc.). Typically it is observed that all of the pixels within one cellular tissue have similar or smoothly varying pixel values. Expressing this assumption in mathematical terms, the systems and methods of the present disclosure utilize the following constraint (3):

$$\sum_{i=1}^{N}\sum_{j=1}^{N} G(i,j)\|x_i - x_j\|^2 \quad (3)$$

By applying this constraint (3), the unmixed values that are generated are similar and smooth varying. This constraint is tied to an assumption that the intensity difference between an unmixed value at pixel i and the unmixed values for all the pixels in a local spatial neighborhood associated around pixel i are small. A weighting factor X is applied to the constraint (cf. above equation (1)), and in exemplary embodiments of the present disclosure, X is a user-specified weighting term that is utilized to determine the intensity value of a pixel based on the neighboring pixels. The method of the present disclosure differs from Ruifrok's method, as Ruifrok's method does not employ the constraint (3). Accordingly, unmixed images generated in accordance with Ruifrok's methods are not as smooth, as they tend to contain "holes and cracks" (see FIG. 1C). The "holes and cracks" in the unmixed images generated by Ruifrok's methods are attributed to Ruifrok's pixel by pixel unmixing that does not take into consideration any information or data about the neighboring pixels (i.e., pixels that are likely to be a part of a same tissue structure).

In step 1090, the unmixed solution X* is obtained by solving the unmixing equation of the present disclosure. Thus, the desired unmixed solution is X*=arg Min E, given the optical densities $y_i$, matrices A and G. In the above equation, as the solution at any arbitrary pixel is dependent on its neighbors solutions, each pixel cannot be solved for independently, as in traditional formulations, such as Ruifrok's. The unmixed solution X* is a matrix, which is a concatenation of all the unmixed solutions from all pixels, and is obtained by solving the equation for all $x_i$'s in the image simultaneously. Following algebraic manipulation and cost function minimization, as shown in FIGS. 11A and 11B, the solution is obtained by solving the following sparse banded equation, $$(D^T+D)X = 2b^T$$

where D is a sparse banded matrix, b is a matrix. The D matrix is constructed from the G and Bk matrices (1 ... N), as shown in 1150 of FIG. 11B. T denotes matrix transpose operator, and X is a matrix, which is solved, indicating the weight of each stain at all pixels in the images. To solve this equation and estimate X* of X, any linear solver method for sparse, banded matrices can be used. In this embodiment, Cholesky sparse linear optimization algorithm, shown in FIGS. 11A and 11B, is utilized. (I. S. Duff, "MA57-A Code for the Solution of Sparse Symmetric Definite and Indefinite Systems," ACM Trans. Math. Software, vol. 30(2), pp. 118-144, 2004 and http://www.mathworks.com/help/matlab/ref/ldl.html).

However, any linear equation solver can be used like LU decomposition, Singular value Decomposition method, Gaussian elimination etc. (cf. Matrix Computations, Third Edition, Gene H. Golub, Charles F. van Loan, The Johns Hopkins University Press, 1996). As it is a large matrix (for a 100×100 image, the matrix is 10000×10000 dimension), i.e. a linear sparse banded matrix, methods which solve sparse linear systems (sparse Gaussian elimination) are most suitable.

The spatial regularized color deconvolution algorithm, of the present disclosure, was applied to a clinical data set containing breast cancer tissue samples was used, for exemplary purposes to demonstrate the deconvolution algorithm of the present disclosure. Slides were stained with DAB for Ki-67 marker and hematoxylin (HTX) for counter stain. The Ki-67 protein is a cellular marker for proliferation and the antigen of it can be exclusively detected within the nucleus. It is known that HTX also marks the nucleus. Due to the co-localization of Ki-67 and HTX markers, we expect to observe both signals at the same location in the unmixed image channels ideally. We used 5-pixel neighbors in the neighborhood graph G. The example unmixing results are shown in FIG. 1C. We compared the spatial regularized color deconvolution of the present disclosure with the most commonly used Ruifrok's method and better performances in terms of the structural completeness and signal continuity, is shown results (A) corresponding to the application of methods of the present disclosure to the input image. As indicated by the arrows in the IHC image patches on the first column (A), holes and missing regions within the nuclei are filled in by the methods of the present disclosure, compared to the "cracked" nuclei from the unmixing of Ruifrok's method shown in columns (B). The unmixing results (A) generated by methods of unmixing, in accordance with the present disclosure, are compared with results (C) generated by a method that applies a spatial smooth filter (e.g., Gaussian filter) to Ruifrok's unmixed channels to solve the spatial discontinuity problem. More specifically, a 5×5 Gaussian filter was applied to the Ruifrok unmixed images and, as shown in FIG. 1C, smoother images relative to results (B) (Ruifrok's method applied alone) were obtained; however, benefits in the improvement of structural completeness is not observed or significantly improved over the application of Ruifrok's method alone to the image.

The spatial regularized color deconvolution method of the present disclosure involves, for example, a color deconvolution algorithm for improved image unmixing based on spatial regularization. Due to the strong spatial dependencies (for example, the nuclei and membrane structures) that exist in cellular structures, the typical Ruifrok's method of deconvolution solves the least-square unmixing problem for each pixel independently and leads to discontinuities in the unmixed images. The method s of the present disclosure is a closed-form mathematically derived solution for and image or image portion (e.g., patch) that involves based spatial regularized unmixing cost function or constraint.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, a cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provides one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework. Those of ordinary skill in the related art will appreciate that interfaces may include one or more GUI's, CLI's or a combination thereof.

A processor may include a commercially available processor such as a Celeron, Core, or Pentium processor made by Intel Corporation, a SPARC processor made by Sun Microsystems, an Athlon, Sempron, Phenom, or Opteron processor made by AMO Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

We claim:
1. An image unmixing method, comprising:
receiving an image of a biological specimen stained with one or more stains, wherein said image includes a plurality of pixels;
converting an intensity value of each pixel in the plurality of pixels in the image to an optical density value and generating a set of optical density values;
obtaining reference color data (A) for the one or more stains;
determining pixel pairing combinations from the plurality of pixels, wherein a pixel pairing combination is a grouping of two pixels;
generating neighbor data for each pixel pairing combination, said generating neighbor data step comprising determining whether the two pixels of the pixel pairing combination are neighbors, wherein the two pixels are neighbors when the two pixels are less than or equal to a predetermined distance from each other; and
using the reference color data, the set of optical density values, and the neighbor data, simultaneously unmixing each pixel in the plurality of pixels and determining a weight of each of the one or more stains for each pixel in the plurality of pixels by solving a single equation.

2. The method of claim 1, wherein the image is an RGB image.

3. The method of claim 1, wherein the image is a multispectral image.

4. The method of claim 1, wherein when the two pixels of a pixel pairing combination are neighbors, a value of one is assigned to the pixel pairing combination.

5. The method of claim 1, wherein when the two pixels of a pixel pairing combination are not neighbors, a value of zero is assigned to the pixel pairing.

6. The method of claim 1, whereby solving the single equation comprises solving a following equation:

$$X^* = \mathrm{argmin} \sum_{i=1}^{N} \|y_i - Ax_i\|^2 + \lambda \sum_{i=1}^{N} \sum_{j=1}^{N} G(i,j) \|x_i - x_j\|^2$$

wherein N is a number of pixels in the plurality of pixels, y is a three-dimensional column pixel vector that represents the optical density values (O), M is a number of stains by which the biological specimen is stained, x is a combination weight vector of the stains, $x_m$, m=1, . . . , M is an $m_{th}$ element of x, G is a neighborhood graph containing the neighbor data, and wherein the matrix A contains the reference color data, wherein each column of A corresponds to a reference stain color and is obtained by sampling from a control slide of pure stain.

7. An image unmixing method, comprising:
receiving an image of a biological specimen stained with one or more stains;

dividing the image into a first patch and a second patch, wherein the first patch includes a first plurality of pixels and the second patch includes a second plurality of pixels;

converting an intensity value of each pixel in the first plurality of pixels in the first patch to an optical density value and generating a first set of optical density values;

obtaining reference color data (A) for the one or more stains;

determining pixel pairing combinations from the first plurality of pixels, wherein a pixel pairing combination of the first plurality of pixels is a grouping of two pixels;

generating a first set of neighbor data for each pixel pairing combination of the first plurality of pixels, said generating first set of neighbor data step comprising:

determining whether the two pixels of the pixel pairing combination from the first patch are neighbors, wherein the two pixels are neighbors when the two pixels are less than or equal to a predetermined distance from each other; and using the reference color data, the first set of optical density values, and the first set of neighbor data, and generating a first set of unmixing results, simultaneously unmixing each pixel in the first plurality of pixels of the first patch and determining a weight of each of the one or more stains for each pixel in the first plurality of pixels by solving a single equation.

8. The method of claim 7, further comprising:

converting an intensity value of each pixel in the second plurality of pixels in the second patch to an optical density value and generating a second set of optical density values;

determining pixel pairing combinations from the second plurality of pixels, wherein a pixel pairing combination of the second plurality of pixels is a grouping of two pixels;

generating a second set of neighbor data for each pixel pairing combination of the second plurality of pixels, said generating a second set of neighbor data step comprising:

determining whether the two pixels of the pixel pairing combination from the second patch are neighbors, wherein the two pixels are neighbors when the two pixels are less than or equal to a predetermined distance from each other; and simultaneously unmixing each pixel in the second plurality of pixels of the second patch and determining a weight of each of the one or more stains for each pixel in the second plurality of pixels by solving a single equation comprising the reference color data, the second set of optical density values, and the second set of neighbor data, and generating a second set of unmixing results.

9. The method of claim 8, further comprising:

combining the first set of unmixing results generated from unmixing the first patch and the second set of unmixing results generated from unmixing the second patch; and generating a combined unmixing result based on the first set of unmixing results.

10. The method of claim 7, wherein the image is a RGB image.

11. The method of claim 7, wherein the image is a multispectral image.

12. The method of claim 7, wherein when the two pixels of a pixel pairing combination are neighbors, a value of one is assigned to the pixel pairing combination.

13. The method of claim 7, wherein when the two pixels of a pixel pairing combination are not neighbors, a value of zero is assigned to the pixel pairing.

14. An image unmixing system, comprising:

an image acquisition module configured to receive an image of a biological specimen stained with one or more stains, wherein said image includes a plurality of pixels;

a pre-processing module configured to determine an optical density value based on an intensity value of each pixel in the plurality of pixels in the image, and generate a set of optical density values, wherein the set of optical density values is stored in an electronic memory;

a reference spectra module configured to obtain reference color data (A) for the one or more stains, and wherein the reference color data is stored in an electronic memory;

a neighborhood regularization module configured to determine pixel pairing combinations from the plurality of pixels, wherein a pixel pairing combination is a grouping of two pixels, and wherein said neighborhood regularization module generates neighbor data for each pixel pairing combination, said neighbor data comprising:

a determination that the two pixels of the pixel pairing combination are at least one of neighbors or not neighbors, and wherein the two pixels are neighbors when the two pixels are less than or equal to a predetermined distance from each other; and wherein said neighbor data is stored in the electronic memory; and an unmixing module configured to, using the reference color data stored in the electronic memory, the set of optical density values stored in the electronic memory, and the neighbor data stored in the electronic memory, simultaneously unmix each pixel in the plurality of pixels and determine a weight of each of the one or more stains at each pixel in the plurality of pixels by solving a single equation.

15. The image unmixing system of claim 14, wherein the image is a RGB image.

16. The image unmixing system of claim 14, wherein the image is a multispectral image.

17. The image unmixing system of claim 14, wherein when the two pixels of a pixel pairing combination are neighbors, a value of one is assigned to the pixel pairing combination.

18. The image unmixing system of claim 14, wherein when the two pixels of a pixel pairing combination are not neighbors, a value of zero is assigned to the pixel pairing.

19. The image unmixing system of claim 14, wherein the unmixing module is configured to perform the simultaneous unmixing by solving a following color deconvolution cost function:

$$X^* = \mathrm{argmin} \sum_{i=1}^{N} \|y_i - Ax_i\|^2 + \lambda \sum_{i=1}^{N} \sum_{j=1}^{N} G(i,j)\|x_i - x_j\|^2$$

wherein N is a number of pixels in the plurality of pixels, y is a three-dimensional column pixel vector that represents the optical density values (O), M is a number of stains by which the biological specimen is stained, x is a combination weight vector of the stains, $x_m$, m=1, . . . , M is an $m_{th}$ element of x, and G is a neighborhood graph containing the neighbor data.

* * * * *